(12) United States Patent
Manson

(10) Patent No.: US 7,181,682 B1
(45) Date of Patent: Feb. 20, 2007

(54) DOCUMENT PUBLISHING AND RENDERING

(75) Inventor: Nicholas Roy Manson, Ontario (CA)

(73) Assignee: Siebel Systems, Inc., San Mateo, CA (US)

( * ) Notice: Subject to any disclaimer, the term of this patent is extended or adjusted under 35 U.S.C. 154(b) by 473 days.

(21) Appl. No.: 10/184,713

(22) Filed: Jun. 27, 2002

(51) Int. Cl.
*G06F 15/00* (2006.01)

(52) U.S. Cl. ............... 715/513; 715/530; 715/525; 715/517

(58) Field of Classification Search ........... 715/513, 715/530, 525, 517
See application file for complete search history.

(56) References Cited

U.S. PATENT DOCUMENTS

| | | | |
|---|---|---|---|
| 5,907,837 A * | 5/1999 | Ferrel et al. ............... | 707/3 |
| 5,986,667 A * | 11/1999 | Jevans ...................... | 345/619 |
| 6,167,409 A * | 12/2000 | DeRose et al. ............ | 715/513 |
| 6,252,677 B1 * | 6/2001 | Hawes et al. ............. | 358/1.9 |
| 6,360,360 B1 * | 3/2002 | Bates et al. .............. | 717/160 |
| 6,631,498 B1 * | 10/2003 | McCauley et al. ........ | 715/517 |
| 6,697,825 B1 * | 2/2004 | Underwood et al. ...... | 715/530 |
| 6,704,798 B1 * | 3/2004 | Mogul ....................... | 709/246 |
| 6,857,102 B1 * | 2/2005 | Bickmore et al. ......... | 715/501.1 |
| 2001/0037412 A1 * | 11/2001 | Miloushev et al. ....... | 709/315 |
| 2002/0040314 A1 * | 4/2002 | Tolson ....................... | 705/10 |
| 2002/0073202 A1 * | 6/2002 | Wang ......................... | 709/227 |
| 2002/0083093 A1 * | 6/2002 | Goodisman et al. ...... | 707/511 |
| 2002/0099870 A1 * | 7/2002 | Miller et al. .............. | 709/328 |
| 2002/0102524 A1 * | 8/2002 | Rizzi et al. ................ | 434/350 |
| 2002/0188635 A1 * | 12/2002 | Larson ....................... | 707/515 |
| 2003/0061305 A1 * | 3/2003 | Copley et al. ............. | 709/217 |
| 2003/0217061 A1 * | 11/2003 | Agassi et al. ............. | 717/10 |
| 2004/0059929 A1 * | 3/2004 | Rodgers et al. ........... | 713/193 |
| 2004/0205545 A1 * | 10/2004 | Bargeron et al. ......... | 715/512 |

* cited by examiner

*Primary Examiner*—Stephen Hong
*Assistant Examiner*—Kristina Honeycutt
(74) *Attorney, Agent, or Firm*—Campbell Stephenson Ascolese LLP

(57) ABSTRACT

A facility for preparing content for display is described. The facility includes a publishing subsystem that, when applied to content, publishes the content. The facility further includes a rendering subsystem that is distinct from the publishing subsystem and that, when applied to content, renders the content.

12 Claims, 5 Drawing Sheets

DOCUMENT PUBLISHING AND RENDERING

TECHNICAL FIELD

The present invention is directed to the field of electronic documents, and, more particularly, to the fields of electronic document generation and adaptation.

BACKGROUND

Displayed web pages contain various kinds of visual information, such as text, images, and links. In some cases, it is desirable to adapt visual information from another source ("included information") for inclusion in a displayed web page. For example, it is sometimes desirable to adapt the contents of a first web page for inclusion in a second web page. This can be useful to present the contents of the second web page in the larger and more persistent context of the first web page.

Certain conventional techniques adapt included information from another source for inclusion in a displayed web page, in that they to adapt the contents of a first HTML web page for inclusion in a second HTML web page. As part of doing so, these conventional techniques transform links occurring in the second HTML web page such that, when these links are traversed, the linked-to information is also displayed in the context of the first HTML web page. These convention techniques also provide for the display of the second HTML web page within the first HTML web page.

These conventional techniques have significant limitations, however, that prevent them from successfully being applied to the more general problem of adapting included information from sources of a wider variety of types, for inclusion in web pages or a wider variety of types. In particular, these conventional techniques are unable to identify and transform links occurring in included information that is not an HTML document, such as included information that is an XML document. In order to enable products using these conventional techniques to identify and transform links occurring in documents of a new type, it would be necessary to develop and distribute a new version of such products.

These conventional techniques are also unable to discern between different types of links in the included document, and transform links of different types in different ways.

Additionally, these conventional techniques are unable to display certain constituent parts of included HTML documents that are not expressed in native HTML, such as XML data islands, which are commonly added to HTML documents by certain applications used to generate HTML documents.

In view of the disadvantages discussed above, a more universal and adaptable system for including information from another source in a displayed web page would have significant utility.

DETAILED DESCRIPTION

Figure 1:
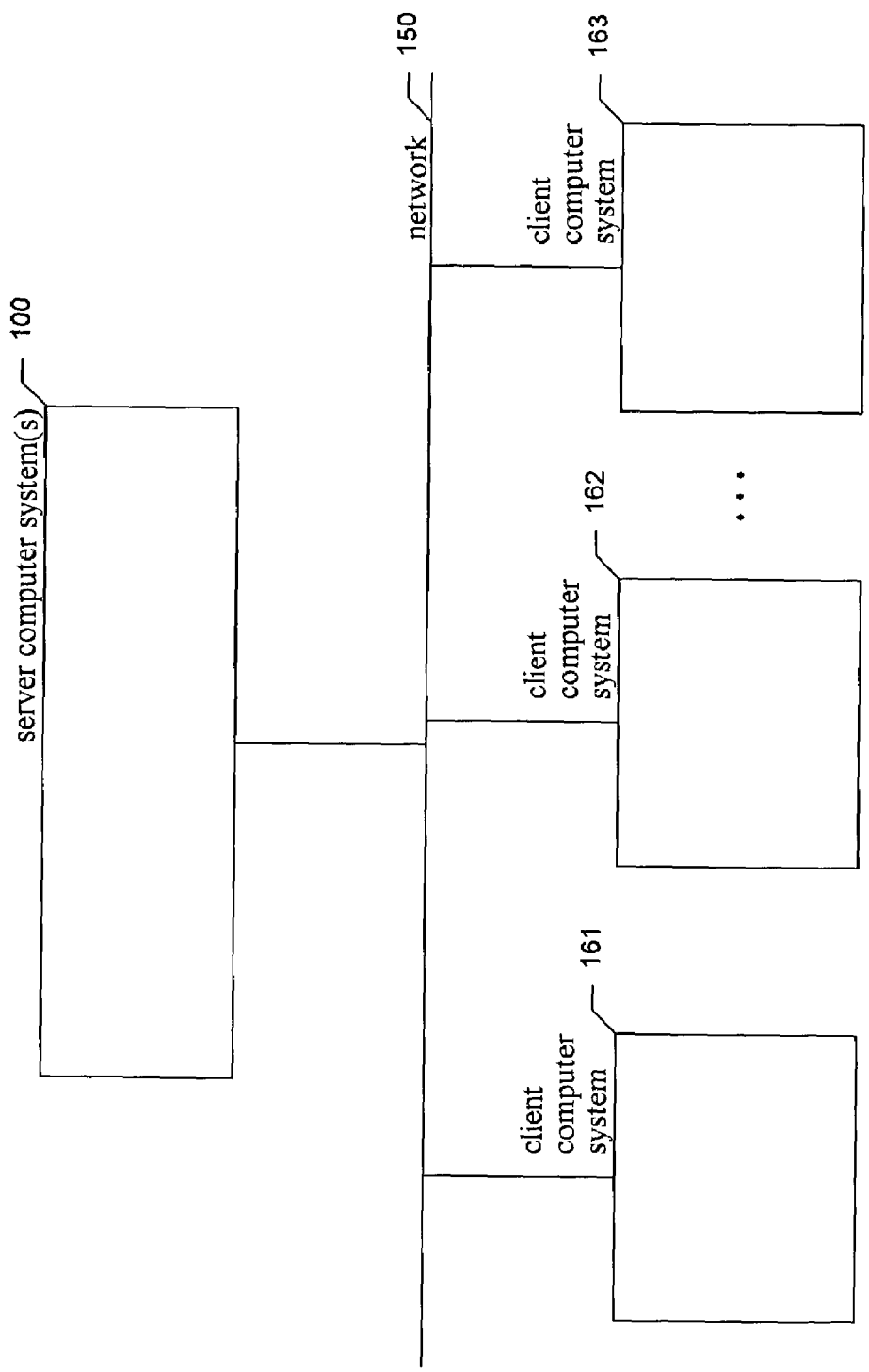
FIG. 1 is a network diagram showing aspects of a typical hardware environment in which the facility operates.

A software facility for electronic document publishing and rendering ("the facility") is described. In particular, the facility prepares electronic content, such as electronic documents, for presentation using a web framework. The web framework can provide such features as: maintaining a consistent visual contexts through the display of a series of different documents from different sources, having different appearances, and/or of different types; tracking the user's browsing activities; providing user authorization services; and enforcing other rules relating to actions the user is able to perform, responses thereto, and the identity and form of displayed information. The display using the framework may be provided as part of a distributed application.

The facility divides the presentation of documents into two differentiable tasks: document publishing, in which a published document is adapted for display within a web framework, and document rendering, in which a rendered document (or other rendered content) is adapted for incorporation in a published document that will be displayed within a web framework. In some embodiments, rendering a document can include converting its type to the type of the published document in which it is incorporated.

In some embodiments, the facility performs document publishing using components that are separate from those used to perform document rendering. In some embodiments, these publishing and rendering components are further divided into versions designed for publishing or rendering documents of a particular type, such as HTML documents. The segregation of publishing and rendering functionality into per-document type components allows the facility to be straightforwardly augmented to process documents of new types.

In some embodiments, each such document type-specific publishing or rendering component is provided as an object class, such that an object of the appropriate class may be instantiated to publish or render a document of a particular type. In some embodiments, all of theses classes are defined as subclasses of abstract publishing and rendering classes, and instances of these classes are instantiated using an abstract class factory for the abstract class. This generally enables new subclasses for publishing or rendering new document types to be developed, distributed, and incorporated in the facility without recompiling or redistributing the facility itself.

The process of publishing or rendering a document often includes the subtask of processing links occurring in the document to support the proper operation of the framework and the enforcement of its rules. In some embodiments, the facility separates the processing of links in published and rendered documents from the larger processes of publishing and rendering those documents. This enables link processing steps, such as link identification, link mapping, and link substitution to be provided by one or more link processing components that are separate from the publishing and rendering components. This isolation of link processing functionality facilitates the reuse of the facility with multiple different frameworks, and with different applications imposing different rules.

In the ways described above, the facility provides powerful and adaptable tools for presenting information contained in electronic documents in conjunction with web frameworks.

FIG. 1 is a network diagram showing aspects of a typical hardware environment in which the facility operates. The network diagram shows one or more server computer systems 100 upon which the server side of a client-server application executes. Multiple server computer systems may be located together in a single location, or distributed across a number of different locations. The server computer systems 100 are connected to a number of different client computer systems 161–163 via a network 150. Each of the client computer systems enables one or more users to access and use the client-server application executing on the server computer system. These client computer systems may be a variety of different devices, including desktop or laptop general-purpose computer systems; personal digital assistants; wired and wireless telephones, etc. The network 150 may use a variety of different networking technologies, including wired, guided or line-of-sight optical, or radio frequency networking. In some embodiments, the network includes the public switched telephone network. Network connections between a client and a server may be fully-persistent, session-based, or intermittent, such as packet-based.

Figure 2:
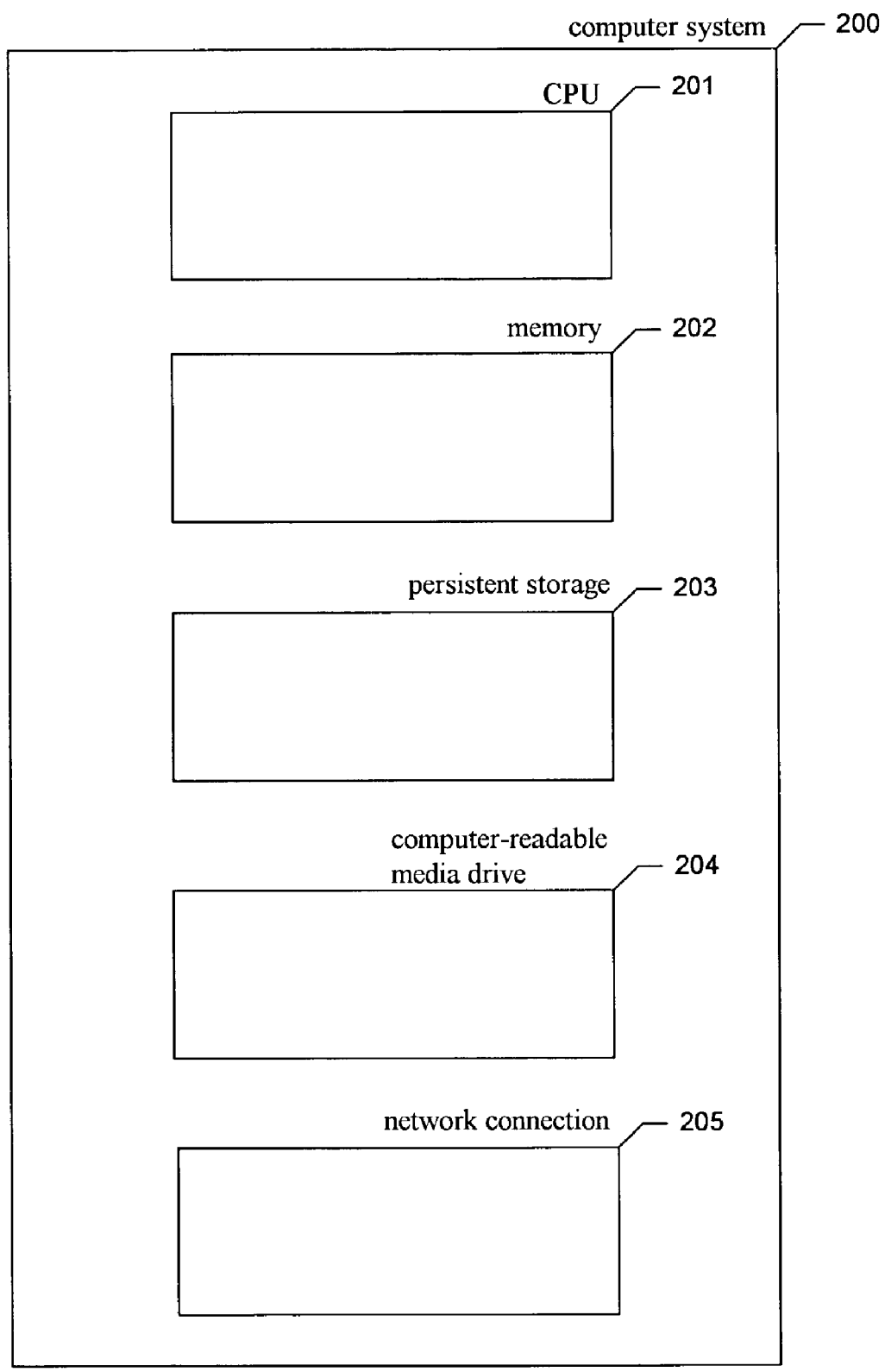
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes, including some or all of the server and client computer systems shown in FIG. 1. These computer systems and devices 200 may include one or more central processing units ("CPUs") 201 for executing computer programs; a computer memory 202 for storing programs and data—including data structures—while they are being used; a persistent storage device 203, such as a hard drive, for persistently storing programs and data; a computer-readable media drive 204, such as a CD-ROM drive, for reading programs and data stored on a computer-readable medium; and a network connection 205 for connecting the computer system to other computer systems, such as via the Internet, to exchange programs and/or data—including data structures. While computer systems configured as described above are typically used to support the operation of the facility, those skilled in the art will appreciate that the facility may be implemented using devices of various types and configurations, and having various components.

Publishing as discussed herein means transforming an input stream into an output stream that is logically equivalent but functions within the application's framework. With web documents, this means that the links within the document must be transformed but the document itself remain visually identical when presented to the browser. The facility uses publishing façades to publish documents.

Publishing façades have the following abstract interface:

| Publishing Facade |
| --- |
| +Initialize(in Properties : Content Type Property Bag, in Environment : Publishing Environment) : Boolean |
| +Publish(in Stream Identifier : Stream Identifier, in Input : Stream, inout Output : Stream) : Boolean |

Applications of the publishing façade provide a publishing environment specified minimally as follows:

| Publishing Environment |
| --- |
| +URLRenderer : URLRenderer Mediator | with a concrete instance of the URL Renderer Mediator class that supports the following interface:

| URLRenderer Mediator |
| --- |
| +RenderSimpleURL(in Stream Identifier : Stream Identifier, in Relative URL : URL, out Rendered URL : URL) Boolean |
| +RenderIntegralURL(in Stream Identifier : Stream Identifier, in Relative URL : URL, out Rendered URL : URL) . Boolean |
| +RenderInclusiveURL(in Stream Identifier : Stream Identifier, in Relative URL : URL, out Rendered URL : URL) : Boolean |

The application of the publishing system creates the publishing façade based on the input stream's content type using an abstract factory. The application then initializes the façade with the property bag for the content type and a concrete URL rendering mediator that implements the link transformation logic that it wishes to enforce. Once this is done, the application may pass an input stream of the content type to the publish method in order to get an output stream that is compatible with its link publishing rules. The publish method may be invoke many times.

The concrete instance of the publishing facade uses the input property bag and built in content type handling logic to locate links in the three categories described below and asks the concrete URL Renderer Mediator to publish them. The identified links are passed to the mediator in a syntax that is relative to the current stream. The mediator is expected to return a rendered URL in relative format (possibly the same URL).

The implementation of the publishing façade abstracts
1. Link identification and classification
2. Link substitution
3. Stream handling The design allows for efficient stream handling of the input file and does not require buffering of entire input document to generate the output document.

A sample application includes concrete publishing facades for
1. markup documents. The concrete class uses property settings to handle HTML, SGML, and XML
2. binary documents. (cases where no transformation is known or required)
3. javascript files.

Rendering as discussed herein means generating an output stream suitable for display within the context of another web document. This is different than publishing because the output stream must be of the same content type as the document that it will be inserted into. In addition, the transformations required for the links may be different from those that would be used for publishing the same document.

A sample application includes a rendering engine for HTML. Separate engines may be implemented for inline rendering in content types such as WML and/or HDML. HTML rendering façades support the following abstract interface:

| HTML Rendering Facade |
| --- |
| +Initialize(in Properties : Content Type Property Bag, in Input : Content Property Bag, in Environment . Rendering Environment) : Boolean |
| +HTMLAttributes( ) : HTML Attribute Set |
| +BODYAttributes( ) : HTML Attribute Set |
| +HEADContent(in Exclusions : XPath List, inout Stream : Stream) : Boolean |

-continued

| HTML Rendering Facade |
| --- |
| +BODYContent(in Exclusions : XPath List, inout Stream : Stream) : Boolean
+GetLinkContext( ) : HTML Link Context |

In addition to the property bag for the content type, applications of the HTML Rendering Façade pass in an abstract property bag containing details about the object to be rendered supporting (minimally) the following interface:

| Content Property Bag |
| --- |
| +Content Identifier : Stream Identifier
+GetTitle( ) : String
+GetContent(inout Content : Stream) : Boolean |

Since this interface is abstract, the actual work of retrieving the content can be deferred for cases where the content stream is not used in the rendering (for example, links to images).

The application also passes in a rendering environment specified as follows:

| Rendering Environment |
| --- |
| +URL Renderer : URLRenderer Mediator | with a concrete instance of an URL Renderer Mediator, discussed above.

The application of the publishing system creates the HTML rendering façade based on the input stream's content type using an abstract factory. The application then initializes the façade with the property bag for the current content type, a property bag of information about the content, and a rendering environment including a concrete instance of the URL Renderer Mediator implementing its application-specific link rendering rules.

The application's URL Renderer works just as in the publishing façade. However, since more is known about the desired output markup type, the HTML Rendering Façade provides a HTML Link Context that the application may use to set additional properties on the link during calls to its URL Renderer methods. The link context is specified minimally as follows:

| HTML Link Context |
| --- |
| +SetTarget( ) : Boolean |

The application requests the HTML document components in order (HTML attributes, HEAD content, BODY attributes, BODY content). BODY content may be requested multiply with different list of XPath exclusions (tags not wanted in the body).

The concrete instance of the HTML Rendering Façade is responsible for formulating the HTML markup to be used while rendering the object and ensures that links are published via the URL Renderer.

A sample application includes HTML rendering facades for content types such as the following:

1. HTML
2. Images (content types preferably rendered as image links)
3. Binaries (content types preferably link to)
4. Javascript
5. Image Maps Because the publishing and rendering façades limit the knowledge about the internal state that the applications have, they can be implemented by aggregating modular link analysis and link substitution logic. This modular logic can be shared across both interfaces.

The modular link analysis and link substitution logic may be implemented, for example, by a link analysis façade specified as follows, together with a link substitution façade specified as shown below:

| Link Analysis Facade |
| --- |
| +Initialize(in Properties : Content Type Property Bag, in Name : String, in Input : Stream) : Boolean
+GetProperty(in Name : String, out Value : String) : Boolean
+GetFirstLink(out Link : Link) : Boolean
+GetNextLink(out Link : Link) : Boolean |

| Link |
| --- |
| +Link Class : Link Class
+Relative Link : URL |

The link substitution façade is specified as follows:

| Link Substitution Facade |
| --- |
| +Initialize(in Properties : Content Type Property Bag, in Name : String) : Boolean
+Substitute(in Input : Stream, in Mappings : Link Mapping Table, inout Output : Stream) : Boolean |

A link mapping table contains a set of link mappings. The table allows efficient lookup of links matching given criteria.

| Link Mapping Table |
| --- |
| +Lookup(in Criteria : Link, out Match : Link) : Boolean |

Each link mapping has an original link and a mapped link.

| Link Mapping |
| --- |
| +Original Link : Link
+Mapped Link : Link |

The Link substitution façade uses the link mapping table to efficiently determine mappings required for identified links. If no mapping is found, the façade copies the link to the output stream without changing it.

In some embodiments, these facades may also form the basis of an import subsystem.

The behavior of links in web content depends on the context of the link. For example, in HTML documents, graphic links occur within the context of an IMG tag and result in the display of a graphic that appears in line to the HTML page.

The system classifies links as being simple, integral, or inclusive. Internally, the system also sub-classifies base links and script links.

Simple links are links that allow the user to traverse from one document to another separate document. An example of a simple link is a HTML HREF.

Integral links are links that cause the browser to pull the contents of the other document into the current document. An example of an integral link is a HTML IMG.

Inclusive links are links that cause the browser to treat the linked document as being part of the current document. Examples of inclusive links include XSL include links.

When returning links, the façade classes categorize them for the application this allows correct treatment of complex links in the web site. For example, an application of the HTML renderer may want to display simple links to other HTML documents using the same HTML renderering application while displaying other simple links in new browser windows. The treatment of the links is left to the application.

The publishing and rendering system hinges on the existence of concrete instances of the following content type abstract factory:

| Content Type Facade Factory |
| --- |
| +GetPublishingFacade( ) : Publishing Facade |
| +GetHTMLRenderingFacade( ) : HTML Rendering Facade |
| +GetLinkAnalysisFacade( ) : Link Analysis Facade |
| +GetLinkSubstitutionFacade( ) : Link Substitution Facade |

Concrete instances of this factory are instantiated using an abstract class factory provider based on a setting in the content type property bag using dynamic class instantiation.

Embodiments of the facility achieve configurability at two levels. The facility supports algorithm configurability and fine-grain setting configurability.

Algorithmic configurability is the ability to dynamically adapt portions of the overall algorithm to specific inputs. In the publishing and rendering system, algorithmic configurability is achieved at the content type level through the use of an abstract factory that constructs concrete facades with abstract interfaces to perform the following tasks:

1. Render a content stream inline to a specified web framework
2. Publish a content stream such that its links interact with the parent web framework
3. Identify and classify the set of links within a stream of content
4. Remap a set of links within a stream of content In this way, the system can use an XML parser to identify links within a XML document and a specialized HTML parser to identify links in a HTML document.

The system selects the appropriate algorithm façade based on the content type of its input stream. Content types are mapped to input streams at an earlier stage using accepted web heuristics including the document's mime content type, extension, SGML document type, and XML namespaces. The mapping of the concrete instance of the abstract factory to the content type is achieved via setting configurability. The concrete factory is loaded using dynamic class loading. Thus, the system may be dynamically expanded to provide custom handling for other content types without requiring recompilation, linking, or re-distribution of any of the non-façade components.

Setting configurability is achieved by defining a database of open-ended string properties for each content type that the system handles. The string properties are modifiable and expandable at runtime. The set of properties defined depends on the requirements of the facades associated with the content type.

At a minimum, the property set generally includes the name of the concrete factory to use when instantiating facades for the content type. For markup languages, the property set includes XPath specifications for a link types found in the class of markup document. These settings are used to implement link categorization.

In order to more fully describe the facility, its operation in conjunction with an example is described. The example involves tracking subscriber readership of magazine articles for an online magazine company whose articles each consist of a HTML page containing text, links, and pictures.

On the magazine web site, both the full articles and the individual pictures can be reached separately by several means. The site publishes indexes and anthologies as well as weekly editions. Regardless of how an item of content is reached, the site displays an advertisement and maintains the site user's current location in a table of contents.

Figure 3:
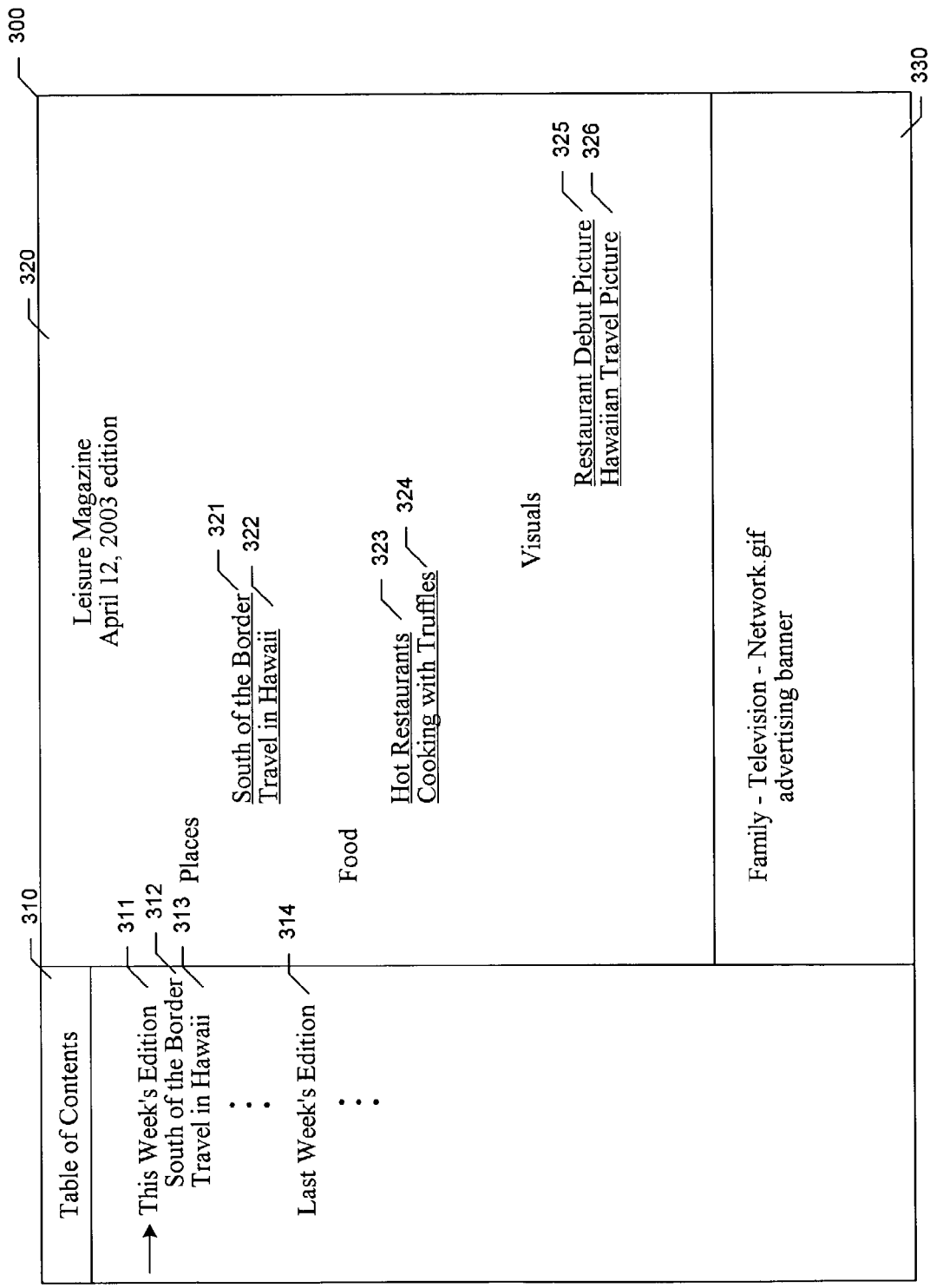
FIG. 3 is a display diagram showing a sample initial display corresponding to the example.

FIG. 3 is a display diagram showing a sample initial display corresponding to the example. The display 300 includes a table of contents 310, in which the user's current location in the web site is tracked. Locations 311–314 are shown, with the location 311 identified as the user's current location. The display further includes document window 320, in which is displayed an overview of the current edition of the magazine. The overview includes links 321–324 to articles in the current edition, as well as links 325 and 326 directly to pictures appearing in the magazine. The display further includes an advertising banner 330 for the Family Television Network.

Management of the magazine suspects that a significant portion of their readership just browses the pictures directly without requesting the text of the articles. The facility is useful to track this phenomenon. Specifically, the facility determines the number of times a picture is requested outside of the context of its containing article.

In a first scenario, a user of the site goes to the 'Travel in Hawaii' article. The article contains a link to the Hawaii tourism site (external to the magazine), a link to another travel article about Fiji, and a 'Hawaii-Travel.gif' picture. In order to do so, the user performs the following:

1) The user selects the 'Travel in Hawaii' article by traversing link 322.

The list of articles is generated by the web site's framework based on data from the corporate database. The framework also generates the client-side markup and script necessary to 'pick' the article. The client side framework formulates and sends the request to the server side framework to display the article.

2) The server side framework renders the article and returns it to the client.

In this example, directly displaying the article would violate business constraints of the framework. Specifically:

i) advertisement must be displayed with the body of the article.

ii) the table of contents must be updated to reflect the user's current location in the site.

In addition, direct publication of the article without using the server-side component of the framework would allow non-subscribers to read it unless a separate security mechanism was generated.

Technically, this necessitates several changes to the HTML article to get it into the web site's HTML framework.
i) The article must be trimmed to fit into the web site page with the advertisement
ii) The link to Hawaii tourism site must be re-written to prevent it from causing the user to exit the magazine's web site completely when traversed.
iii) The link to the Fiji article must be re-written to change the user's location in the web site's table of contents when traversed.
iv) The commands in the article to retrieve the pictures must be rewritten to avoid accidentally conflicting with the commands to retrieve the pictures for the advertisements. (The 'Hawaii-Travel.gif' advertising banner must not get mixed up with the 'Hawaii-Travel.gif' picture.)

Figure 4:
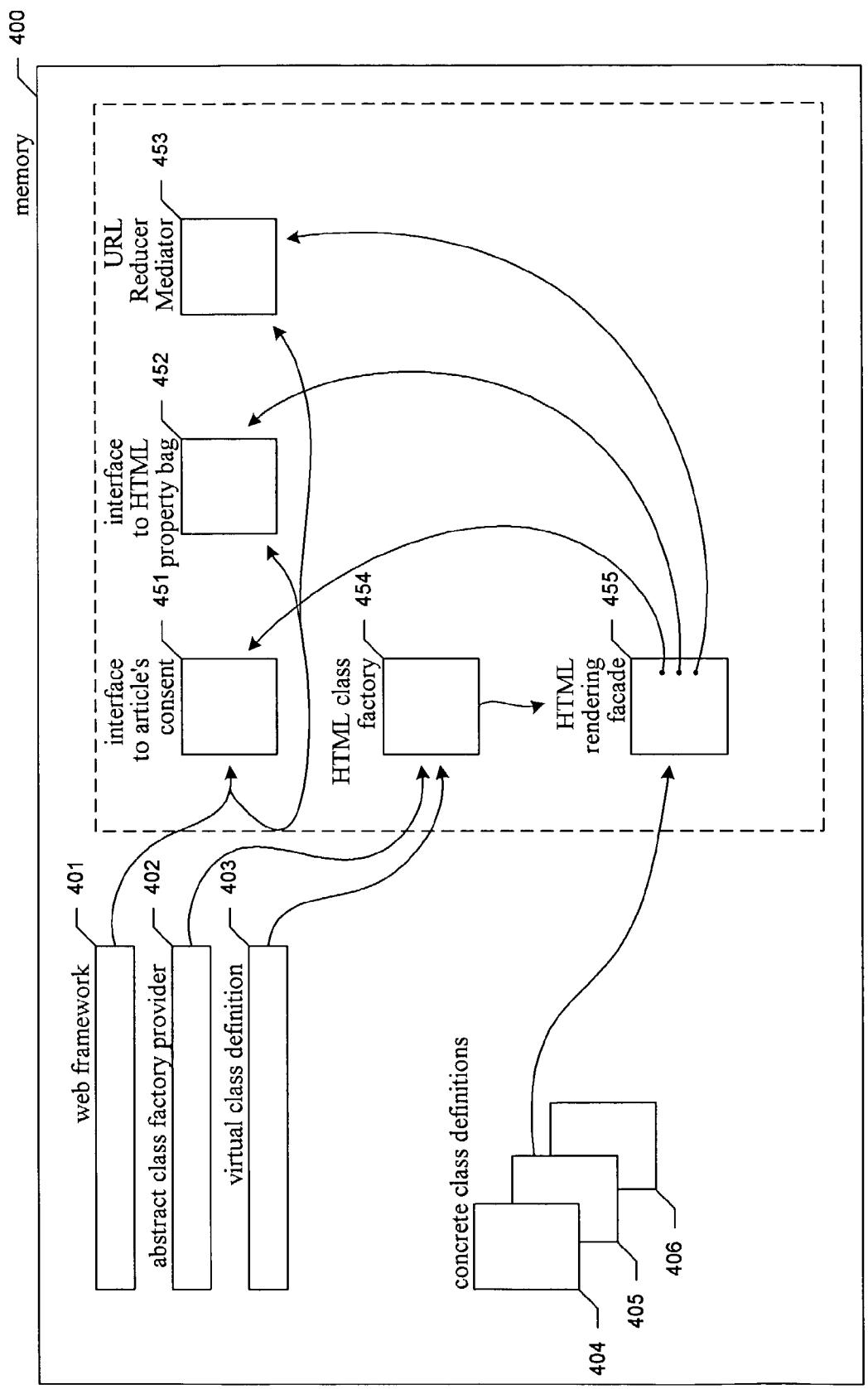
FIG. 4 is a block diagram tracking typical steps performed by the facility in order to complete this process.

FIG. 4 is a block diagram tracking typical steps performed by the facility in order to complete this process. These steps are typically performed by the web framework 401, residing in a memory 400. Data structures 450 are constructed as part of this process. The web framework:
i) performs its normal work of maintaining the site location.
ii) performs the additional work of tracking the fact that the current user accessed the article.
iii) generates the beginning of the HTML article web page with the advertising banner on it.
iv) requests the article's content type. In this case, it is also HTML.
v) builds an interface 451 to the requested article's content. The interface allows efficient access to the article's data stream and meta-data such as the article title and the article system identifier.
vi) builds an interface 452 to the set of system-wide properties for the content type (a property bag).
vii) builds a URL Renderer Mediator 453 that supports its framework and business rules for rendering articles.
viii) requests the content type-specific class factory 454 from the abstract factory class provider 402, which the abstract factory class provider generates using a virtual class definition 403.
ix) requests an instance of the HTML Rendering Facade 455 from the class factory, which the class factory generates using a concrete class definition 405 for the HTML Rendering Façade class.
x) initializes the HTML Rendering Facade with the URL Renderer Mediator, the interface for accessing the article, and the interface for accessing the system properties for the article's content type.
xi) requests the parts of the article necessary to complete the article web page in terms native to its targeted rendering.
xii) transmits the article web page, complete with the rendered article, back to the user.

The HTML Rendering Facade is responsible for solving the problem of determining what to return to web framework when it requests parts for its web page. In this case, the HTML Rendering Facade is asked for a rendering that will fit within a HTML BODY tag. The facade:
i) requests the article's data stream from the content interface.
ii) parses the data stream using an encapsulated HTML parser.
iii) identifies the parts of the stream necessary to construct the BODY content using the system-wide settings for the HTML content type and built-in parsing rules.
iv) builds the BODY content from the parts after using the URL Renderer Mediator to transform any identified links to comply with web framework and business logic rules.

Since the HTML Rendering Facade is specific to the HTML content type, the class can be written much more simply than generic rendering code which would have to handle multiple content types. As a result, it can be optimized to a greater extent than more general—and correspondingly more complex—rendering code.

It is important to note that the web framework requests HTML parts to render a HTML web page regardless of the content type of the article. While it would be trivial to change the Rendering Facade design to add an additional abstract factory parameterized on the rendering type (HTML, WML, HDML, . . . ), this would in some senses be disadvantageous, because rendering is very specific to the target content type. A great deal of over-abstraction is avoided by keeping the Rendering Facade interface specific to the target content type.

The URL Renderer Mediator transforms parts of the requested rendering to a form compatible with the web framework and business logic rules. In this case, the URL Renderer Mediator would:
i) set the context of the Hawaii tourism web site link to launch in a new browser so the magazine web site does not disappear.
ii) re-write the link to the Fiji article so the article gets laid out in the same place as the Hawaii article. This may involve using the system identifier as a base to resolve the relative URL to the Fiji article that would be stored in the Hawaii article.
iii) re-write the commands to display graphics so they use the publishing feature of the web framework. This allows them to be displayed more directly without the ad banner and other rendering steps the article required.
iv) modify the resulting graphic commands to disable the tracking feature since an article displayed them.

Since the HTML Rendering Facade does all the work of identifying the links and describing their characteristics, the URL Renderer Mediator can achieve this complex business logic by implementing simple rules:
i) always launch links to external URLs in a new browser.
ii) use the framework's page navigation commands to traverse links to sibling articles.
iii) display integral objects like graphics without ad banners or hit count tracking.

The use of the URL Renderer Mediator only to transform links is a reflection of the nature of web frameworks. The design could be trivially extended to include other identified components of the target rendering requiring transformation to comply with the framework and business logic. However, the treatment and use of links is central to the logic of web frameworks.

3) The user's browser receives the article web page, reads it and executes the commands to retrieve the graphics on the page.

Because the HTML Rendering's mediator chose to use publishing for these links, the commands executed will go to the framework's publishing facility. The design requires a separate facility for publishing because published items are not transformed to fit within the context of a larger framework construct.

To publish a graphic, the framework:
i) does not change to site location. The user is still viewing the same article.
ii) skips the tracking step because the URL Renderer Mediator for the HTML Rendering Facade modified the command to disable it.
iii) requests the graphic's content type. For this example, the content type is GIF.
iv) requests the graphic's data stream.
v) builds an interface to the set of system-wide properties for the content type (a property bag).
vi) builds a URL Renderer Mediator that supports its framework and business rules for publishing.
vii) requests the content type-specific class factory from the abstract factory class provider.
viii) requests an instance of the Publishing Facade from the class factory.
ix) initializes the Publishing Facade with the URL Renderer Mediator, and the interface for accessing the system properties for the article's content type.
x) builds an interface to the output stream that the framework will return.
xi) publishes the data stream directly to the output stream using the Publishing Facade passing in an opaque system identifier.

The Publishing Facade is responsible for reading the input stream and rewriting it to the output stream. If links are present, the Publishing Facade uses the URL Renderer Mediator in the same manner as the rendering interface.

In this case, the URL Renderer Mediator might:
i) render all subsequent links using publishing commands
ii) disable tracking for all subsequent links Note that in the case of most graphics, no publishing is required. In this case, the design allows for a single copy. This is no more than any proxying operation would require. Furthermore, the design allows for streaming. So, the entire published object need never be stored entirely in memory.

The case where graphics contain links is relatively obscure now, but this functionality is useful because:
i) business logic might require the framework to publish certain HTML pages.
ii) new types such as Vector Markup Language are emerging with the facility to include or refer to subdocuments (when taken in combination with other XML specifications).
4) The pictures appear in the user's web browser in the correct locations in the article.

Figure 5:
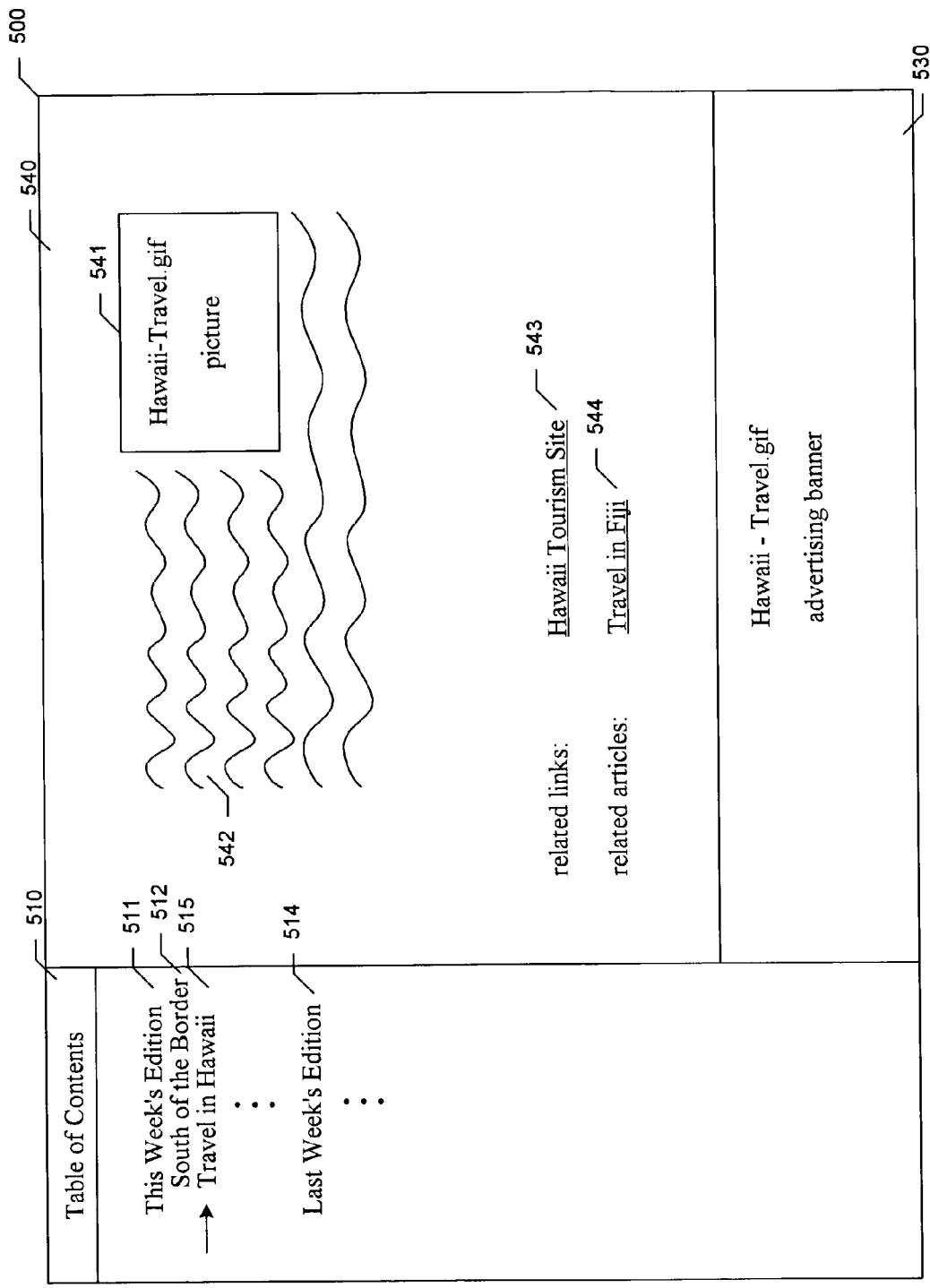
FIG. 5 is a display diagram showing a sample resulting display generated by the facility.

FIG. 5 is a display diagram showing a sample resulting display generated by the facility as described above. The display 500 includes an updated table of contents 510, with the selected Traveling Hawaii article 513 identified as the user's current location. Content area 540 contains the published version of the 'Travel in Hawaii' article, comprising: the picture 541 that accompanies the article; article text 542; an external link 543 to the Hawaii tourism web site; and an internal link 544 to another magazine article entitled 'Travel in Fiji.' The display also includes an advertising banner 530 for a Hawaii Travel promotion.

In a second scenario, the user of the site goes to the 'Hawaii-Travel.gif' picture 541 directly. In order to do so, the user performs the following sequence of actions:
1) The user selects the 'Hawaii-Travel.gif' picture by traversing the Hawaii Travel Picture link 326 shown in FIG. 3.

As with the 'Travel in Hawaii' article, the framework handles selection of the picture. The framework can do this using either the rendering mechanism or the publishing mechanism (2a and 2b below). This is a reflection of the orthogonality of the two sub-systems to the requirements of the web framework.

2a) The server side framework receives a request to 'render' the picture.

This functions exactly like rendering the article above except the 'GIF' content type's HTML Rendering Facade is used.

The 'GIF' content type HTML Rendering Facade might decide to implement inline rendering of the graphic by generating a command to display the graphic as the body content. Note that this algorithm is significantly different and a lot simpler than the algorithm for rendering HTML in HTML.

Since the details of handling the graphic are entirely encapsulated within the HTML Rendering Facade, the same URL Renderer Mediator could be used. This allows consistent business and framework logic regardless of the content type rendered.

or 2b) The server side framework receives a request to 'publish' the picture.

This has the same result as the publishing of the picture from the first scenario, except that the tracking feature is not disabled. So, the user's action is counted as per business requirements.

In this way, the separation of the task into rendering and publishing allows the framework to implement logic based on 'documents.' This extends the web framework to work at a level above the resource (page and graphic) level that frameworks normally operate at without requiring it to know the intricacies of each content type it handles.

3) The picture appears either with advertisement or without, depending on the business logic enforced by the web framework.

It will be appreciated by those skilled in the art that the above-described facility may be straightforwardly adapted or extended in various ways. While the foregoing description makes reference to preferred embodiments, the scope of the invention is defined solely by the claims that follow and the elements recited therein.

I claim:
1. An apparatus comprising:
a computer system configured to prepare content for display comprising
a publishing subsystem that, when applied to content, is configured to publish the content as a web document by virtue of being configured to transform an input stream associated with the content into an output stream logically equivalent to the input stream, wherein the published web document is published irrespective of a context of another web document; and
a rendering subsystem distinct from the publishing subsystem that, when applied to content, is configured to render the content by virtue of being configured to transform an input stream associated with the content into an output stream suitable for display without the need for information regarding a context of another web document, wherein
the rendering subsystem comprises a link transformation function configured to identify and transform links occurring in the content, and the link transformation function is configured to perform the transformation of each identified link based upon a link category attributed to the identified link.

2. The computer system of claim 1 wherein the publishing subsystem includes a publishing function, and wherein the rendering subsystem includes a rendering function distinct from the publishing function.

3. The computer system of claim 1 wherein the publishing subsystem is accessed using a publishing application programming interface call, and wherein the rendering subsystem is accessed using a rendering application programming interface call distinct from the publishing application programming interface call.

4. The computer system of claim 1 wherein the publishing subsystem publishes content by preparing the content to be displayed in an encompassing framework, and wherein the rendering subsystem renders the content by transforming the content to reside within an incorporating construct to be displayed in an encompassing framework.

5. One or more computer memories collectively containing a data structure comprising a plurality of properties, when taken together, are configured to characterize a selected type of document, such that the properties in the data structure allow:
   a routine for rendering documents to use the data structure to render a web document of the selected type by generating an output stream suitable for display within a context of another web document, wherein
      the routine for rendering comprises a link transformation function configured to identify and transform links occurring in the content, and
      the link transformation function is configured to perform the transformation of each identified link based upon a link category attributed to the identified link, and
   a routine for publishing documents to use the data structure to publish a web document of the selected type by transforming an input stream into a corresponding output stream that is logically equivalent to the input stream, wherein
      the routine for rendering documents and the routine for publishing documents are separate from one another, and
      the published web document is published without the need for information regarding a context of another web document.

6. The computer memories of claim 5 wherein the properties comprising the data structure are arranged in a bag structure.

7. A method in a computer system comprising:
   rendering contents of multiple types comprising
      receiving for rendering, in a single interface, instances of content of two or more different types; and
      rendering the instances of content received in the interface by generating an output stream suitable for display within a context of another web document, wherein
         the rendering and the display are performed separately from one another,
         the rendering comprises a link transformation that identifies and transforms links occurring in the content, and
         the link transformation of each identified link is performed based upon a link category attributed to the identified link,
      for each received instance of content:
         determining the type of the instance of content, and passing the instance of content to a function for rendering the content selected based on the determined type;
      instantiating an object whose class corresponds to the determined content type, and that exposes the rendering function as a method; and
      creating a class factory corresponding to the determined content type corresponding to for instantiating the object, wherein the class factory is created by an abstract class factory provider.

8. A method in a computing system comprising:
   adapting content to a display environment comprising
      receiving calls to a rendering function, each call to the rendering function specifying content to render;
      for each call to the rendering function received:
         calling a link transformation function to identify and transform links occurring in the specified content, wherein the transformation of each identified link is performed based upon a link category attributed to the identified link, and
         rendering the specified content using the transformed links and by generating an output stream associated with the specified content and suitable for display within a context of another web document, wherein the rendering the specified content is performed in response to the invocation of a rendering method of an object of a distinguished subclass of the abstract rendering class;
      receiving calls to a publishing function, each call to the rendering function specifying content to publish, wherein the rendering function and the publishing function are separate from one another; and
      for each call received in the publishing function:
         calling the link transformation function to identify and transform links occurring in the specified content, and
         publishing the specified content using the transformed links and by transforming the specified content to be published into a corresponding output stream that is logically equivalent to an input stream associated with the specified content to be published and wherein the specified content is published without considering a context of any other web document.

9. The method of claim 8, further comprising:
   receiving calls to the link transformation function; and
   for each call received in the link transformation function:
      identifying the links occurring in the specified content, and
      transforming the identified links.

10. The method of claim 9, further comprising:
    for each call received in the link transformation function, and
    for each link identified in the specified content,
    attributing the link category to the identified link.

11. The method of claim 10 wherein the identification and attribution of links is performed by one of a plurality of first programmatic entities selected based on a type of the specified content, and wherein the transformation of links is performed by a second programmatic entity.

12. A method in a computing system comprising:
    rendering a document of a selected type in a type-based rendering system otherwise unable to render the document of the selected type, wherein the rendering system comprises an abstract rendering class and the rendering comprises rendering a document of a distinguished type other than the selected type in response to the invocation of a rendering method of an object of a distinguished subclass of the abstract rendering class, the distinguished subclass corresponding to the distinguished document type, the object being instantiated by an abstract class factory for the abstract rendering class, wherein the rendering the document of the distinguished type other than the selected type comprises performing a link transformation to identify and transform links occurring in the content, and the transformation of each identified link is performed based upon a link category attributed to the identified link;

receiving a class definition for a selected subclass of the abstract rendering class, the selected subclass implementing a method for rendering a document of the selected type;

using the received class definition to instantiate an object of the selected class; and rendering a document of the selected type in response to the invocation of a rendering method of the object of the selected subclass; and wherein the rendering is performed by generating an output stream suitable for display within a context of another web document, wherein the rendering the document of the distinguished type other than the selected type is distinct from the display of the output stream.

* * * * *